(12) United States Patent
Xu et al.

(10) Patent No.: US 7,451,033 B2
(45) Date of Patent: Nov. 11, 2008

(54) LATERAL AND LONGITUDINAL VELOCITY DETERMINATION FOR AN AUTOMOTIVE VEHICLE

(75) Inventors: Li Xu, Allen Park, MI (US); Hongtei Eric Tseng, Canton, MI (US); Joseph C. Meyers, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 526 days.

(21) Appl. No.: 11/160,148

(22) Filed: Jun. 10, 2005

(65) Prior Publication Data

US 2007/0005212 A1 Jan. 4, 2007

(51) Int. Cl.
*B60G 17/06* (2006.01)
*G06F 17/00* (2006.01)

(52) U.S. Cl. ............................. 701/70; 701/38; 701/45

(58) Field of Classification Search .................. 701/70, 701/45–47, 36; 340/425.5, 438; 280/734–735, 280/728.1; 180/170; 307/9.1
See application file for complete search history.

(56) References Cited

U.S. PATENT DOCUMENTS

| | | | |
|---|---|---|---|
| 6,725,140 B2 | 4/2004 | Lu et al. | |
| 6,792,803 B2 | 9/2004 | Bauer et al. | |
| 6,816,804 B1 | 11/2004 | Lee | |
| 7,222,007 B2 * | 5/2007 | Xu et al. | 701/38 |
| 2003/0163226 A1 | 8/2003 | Tan | |

FOREIGN PATENT DOCUMENTS

JP 09-318647 12/1997

OTHER PUBLICATIONS

Tseng, H.E., Ashrafi, B., Madau, D., Brown, T., Recker, D: "The Development of Vehicle Stability Control at Ford—Interactive Vehicle Dynamics", Ford Motor Company.
Ryu, Jihan; Rossetter, Eric J.; Gerdes, J. Christian: "Vehicle Sideslip and Roll Parameter Estimation Using GPS", Design Division, Deptartment of Mechanical Engineering, Stanford University, Stanford, CA.
Nishio, Akitaka; Kenji, Tozu; Yamaguchi, Hiroyuki; Asano, Katsuhiro; Amano, Yasushi: "Development of Vehicle Stability Control System Based on Vehicle Sideslip Angle Estimation", SAE 2001 World Congress, Detroit, MI Mar. 5-8, 2001.

(Continued)

*Primary Examiner*—Yonel Beaulieu
(74) *Attorney, Agent, or Firm*—Fredrick Owens

(57) ABSTRACT

A system (18) for controlling a safety system (44) of a vehicle (10) is disclosed herein. The system includes a longitudinal acceleration sensor (36), a vehicle or wheel speed sensor(s) (20), a lateral acceleration sensor (32), a yaw rate sensor (28), and a controller (26). The controller determines a stability index and provides a first observer that determines a reference longitudinal velocity in response to the sensors. The controller determines a reference lateral velocity in response to the sensors. The controller provides a second observer that determines a second longitudinal velocity in response to the sensors and a first adjustment based on the reference longitudinal velocity. The controller determines a second lateral velocity in response to the sensors and a second adjustment based on the reference lateral velocity. The controller determines an output lateral velocity and an output longitudinal velocity in response to the first and second observers and the stability index and accordingly controls the safety system.

22 Claims, 2 Drawing Sheets

OTHER PUBLICATIONS

Van Zanten, Anton T.; Erhardt, Rainer; Pfaff, Georg; Kost, Friedrich; Hartmann, Uwe; Ehret, Thomas: "Control Aspects of the Bosch-VCS", AVEC'96 International Symposium on Advanced Vehicle Control, Jun. 24-28, 1996.

Abe, Masato: "On Adanced Chassis Control Technology for Vehicle Handling and Active Safety", AVEC'96 International Syposium on Advanced Vehicle Control; Jun. 24-28, 1996.

Nagai, Masao; Yamanaka, Sachiko: "Integrated Control Law of Active Rear Wheel Steering and Direct Yaw Moment Control", AVEC'96 International Symposium on Advanced Vehicle Control; Jun. 24-28, 1996.

Fukada, Yoshiko: "Estimation of Vehicle Slip-angle with Combination Method of Model Observer and Direct Integration". Toyota Motor Corp., Chassis Systems Development Division, AVEC'98 (Sep. 1998).

* cited by examiner

LATERAL AND LONGITUDINAL VELOCITY DETERMINATION FOR AN AUTOMOTIVE VEHICLE

TECHNICAL FIELD

The present invention relates generally to a control apparatus for controlling a system of an automotive vehicle in response to sensed dynamic behavior, and more specifically, to a method and apparatus for controlling the system of the vehicle by determining the lateral and longitudinal velocity of the vehicle.

BACKGROUND

In recent years, various vehicle yaw stability control systems that prevent vehicles from spinning out and drifting using differential braking have been developed. Lateral velocity (or side slip angle) is one of the most important vehicle dynamic variables for these systems and is also crucial for many other chassis control functions. In critical dynamic situations, lateral velocity is necessary to detect and then control an unstable vehicle which may have normal yaw rates. Also in these situations, the longitudinal vehicle velocity cannot be accurately measured by wheel speed because of excessive wheel slip. Hence a successful vehicle dynamics control must involve an accurate determination of the vehicle lateral and longitudinal velocities. Although it is possible to measure vehicle velocities directly by using dedicated measuring devices such as optical sensor and GPS, there are practical issues such as cost, accuracy and reliability that prevent the use of such devices on production vehicles.

The vehicle state estimation algorithms implemented on a production vehicle for vehicle dynamic control purposes are normally based on dead reckoning sensors only, such as wheel/steering encoders and inertia sensors which are utilized to predict the high frequency behavior of the vehicle. The vehicle state estimates may be obtained from a physical vehicle model, or via integration of the inertial sensor signals, or a combination of both. The estimation accuracy, however, can be very crude for a lot of maneuvers/road conditions, which in turn severely limits the control performance. One reason is that the vehicle model is only effective in the linear region. Another, perhaps more important, reason is that there is simply not enough inertia information. In order to accurately estimate vehicle states in all operating modes, a full six-degree-of-freedom inertial measurement unit (IMU) may be used. A typical IMU consists of three accelerometers and three gyroscopes mounted in a set of three orthogonal axes. The IMU measures the acceleration and the rotation rate of the vehicle in all three dimensions at a high sampling rate, typically at frequencies higher than 100 Hz. From this information, the velocity of the vehicle may be derived via mathematical integration. Vehicle position and heading are generally not observable without external information.

Recent progress in the development of Micro-Electro Mechanical Systems (MEMS) has made it possible to put IMU on production vehicles because of their small size, low cost and ruggedness. The reduction in size and cost, especially cost, however, has also led to a drop in accuracy of the inertial unit as a whole. The predominant error sources in the inertial sensors, whether they are gyros or accelerometers, are bias, scale factors and random walk. These errors are added up via mathematical integration, and may lead to large drifts in the attitude and velocity estimates, unless external absolute sensors are used to constantly bound the errors.

In practice, all inertia sensing systems are aided in some way by low frequency external sensors, such as global positioning system (GPS), Doppler radar, or star trackers to name a few. Due to the increasing popularity and decreasing cost of GPS, a lot of effort has been devoted to the development of GPS aided inertial systems for vehicle control purpose. While fairly good estimation accuracy may be attained in open sky environment using this approach, the performance deteriorates when the satellite signals bounce off of reflective surfaces such as tall buildings and other structures in the "urban canyon." In the worst case, when fewer than three or four satellites can be "seen" (i.e., driving through a tunnel), the GPS provides no information to bound the errors associated with high frequency inertia sensors. Another disadvantage is that GPS devices are not at all common and/or cost effective on current production vehicles.

Therefore, there is a significant need for a low-cost device that provides accurate and robust estimate of the vehicle lateral velocity and longitudinal velocity.

SUMMARY OF THE INVENTION

It is an objective of the present invention to provide a methodology for estimating the longitudinal velocity and the lateral velocity of a vehicle. The proposed methodology may use, for example, the following sensors: (i) a low-cost strapdown IMU sensor cluster, (ii) a steering wheel angle sensor, (iii) and wheel speed sensors. The method utilizes the kinematic relationship among sensor signals, a bicycle model, and the nonholonomic constraints for a vehicle moving on a surface. The vehicle velocity estimates are obtained via a fusion of data from some or all of the sensors.

It is also an objective of the present invention to provide a system for controlling a safety system of an automotive vehicle. In one embodiment, the system includes a longitudinal acceleration sensor, a vehicle speed sensor and/or wheel speed sensors, a lateral acceleration sensor, a yaw rate sensor, and a controller. The controller determines a stability index and provides a first observer that determines a reference longitudinal velocity in response to a longitudinal acceleration signal, a yaw rate signal, a pitch attitude, and a vehicle speed from wheel speed sensors. The controller also determines a reference lateral velocity in response to a lateral acceleration signal, a yaw rate signal, a roll attitude, a pitch attitude, and a vehicle speed from the wheel speed sensors. The controller also provides a second observer that determines a second longitudinal velocity in response to a longitudinal acceleration signal, a yaw rate signal, a lateral velocity, a pitch attitude, and a first adjustment based on the reference longitudinal velocity. The controller further determines a second lateral velocity in response to a lateral acceleration signal, a yaw rate signal, a roll attitude, a pitch attitude, and a second adjustment based on the reference lateral velocity. The controller moreover determines an output lateral velocity and an output longitudinal velocity in response to the first observer, the second observer, and the stability index. The controller ultimately controls the safety system in response to the output lateral velocity and the output longitudinal velocity.

It is another objective of the present invention to provide a technique of qualifying different sensor signals so that they may be fused to accurately estimate the vehicle velocities. A number of criteria are proposed for identifying cases that are not suitable for using one sensor signal but suitable for using others. As a result, the proposed sensing algorithm is robust to sensor bias and noise, vehicle maneuvers, vehicle parameter variation, road disturbances and the friction coefficient between the tires and the road.

It is yet another objective of the present invention to optimize the vehicle performance for ride, safety and fuel economy by providing an accurate estimate of the vehicle velocity. Even in future vehicle models equipped with standard GPS devices, the proposed methodology is able to help achieve desired performance when sky-obstruction/GPS faults occur.

Other advantages and features of the present invention will become apparent when viewed in light of the detailed description of the preferred embodiment when taken in conjunction with the attached drawings and appended claims.

DETAILED DESCRIPTION

Figure 1:
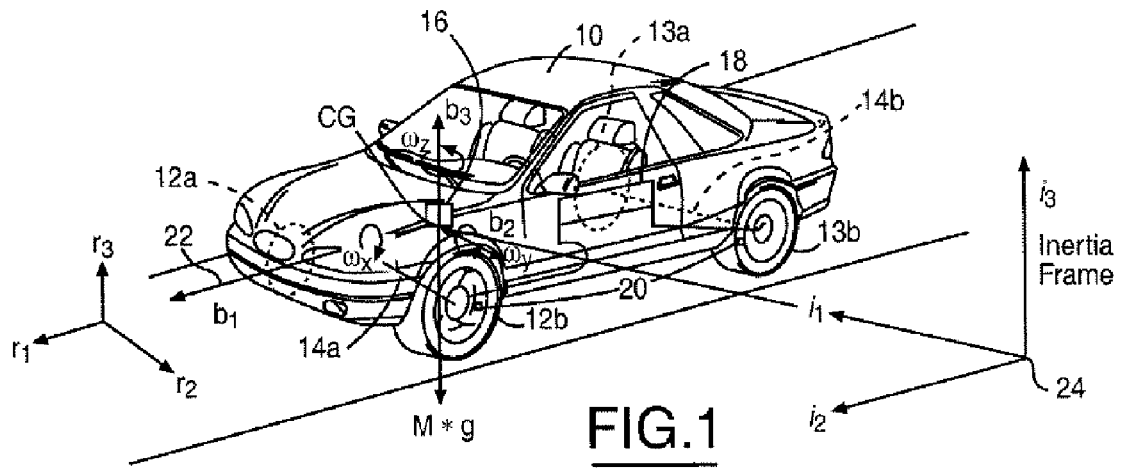
FIG. 1 is a diagrammatic view of a vehicle with variable vectors and coordinator frames according to the present invention.

In the following figures the same reference numerals will be used to identify the same components.

The present invention may be used in conjunction with a dynamic control system of a vehicle such as, for example, a rollover control system (RCS) or a yaw stability control (YSC) system. However, the present invention may also be used with a deployment device such as an airbag or a roll bar. The present invention will be discussed below in terms of preferred embodiments relating to an automotive vehicle moving on a three-dimensional road terrain.

Referring to FIG. 1, an automotive vehicle 10 with a safety system of the present invention is illustrated with the various forces and moments thereon during a rollover condition, spinning out condition, and plowing condition. Vehicle 10 has front right and front left tires 12a and 12b and rear right tires 13a and left rear tires 13b, respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels or vice versa. Generally, the vehicle has a weight represented as Mg at the center of gravity of the vehicle, where g=9.8 m/s$^2$ and M is the total mass of the vehicle.

As mentioned above, the system may also be used with active/semi-active suspension systems, anti-roll bar or other safety devices deployed or activated upon sensing predetermined dynamic conditions of the vehicle.

The sensing system 16 is coupled to a control system 18. The sensing system 16 may use a standard yaw stability control sensor set (including lateral accelerometer, yaw rate sensor, steering angle sensor and wheel speed sensor) together with a roll rate sensor, a pitch rate sensor, and a longitudinal accelerometer. The various sensors will be further described below. The wheel speed sensors 20 are mounted at each corner of the vehicle, and the rest of the sensors of sensing system 16 are preferably mounted directly on the center of gravity of the vehicle body, along the directions x, y and z shown in FIG. 1. It should be noted that less than four wheel sensors may be used such as a three channel system. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. The present invention calculations preferably take place in an inertial frame 24 that may be derived from the body frame 22 as described below.

The angular rate sensors and the accelerometers are mounted on the vehicle car body along the body frame directions $b_1$, $b_2$ and $b_3$, which are the x-y-z axes of the vehicle's sprung mass.

The longitudinal acceleration sensor is mounted on the car body located at the center of gravity, with its sensing direction along $b_1$-axis, whose output is denoted as $a_x$. The lateral acceleration sensor is mounted on the car body located at the center of gravity, with its sensing direction along $b_2$-axis, whose output is denoted as $a_y$.

The other frame used in the following discussion includes the road frame, as depicted in FIG. 1. The road frame system $r_1 r_2 r_3$ is fixed on the driven road surface, where the $r_3$ axis is along the average road normal direction computed from the normal directions of the four tire/road contact patches.

Figure 2:
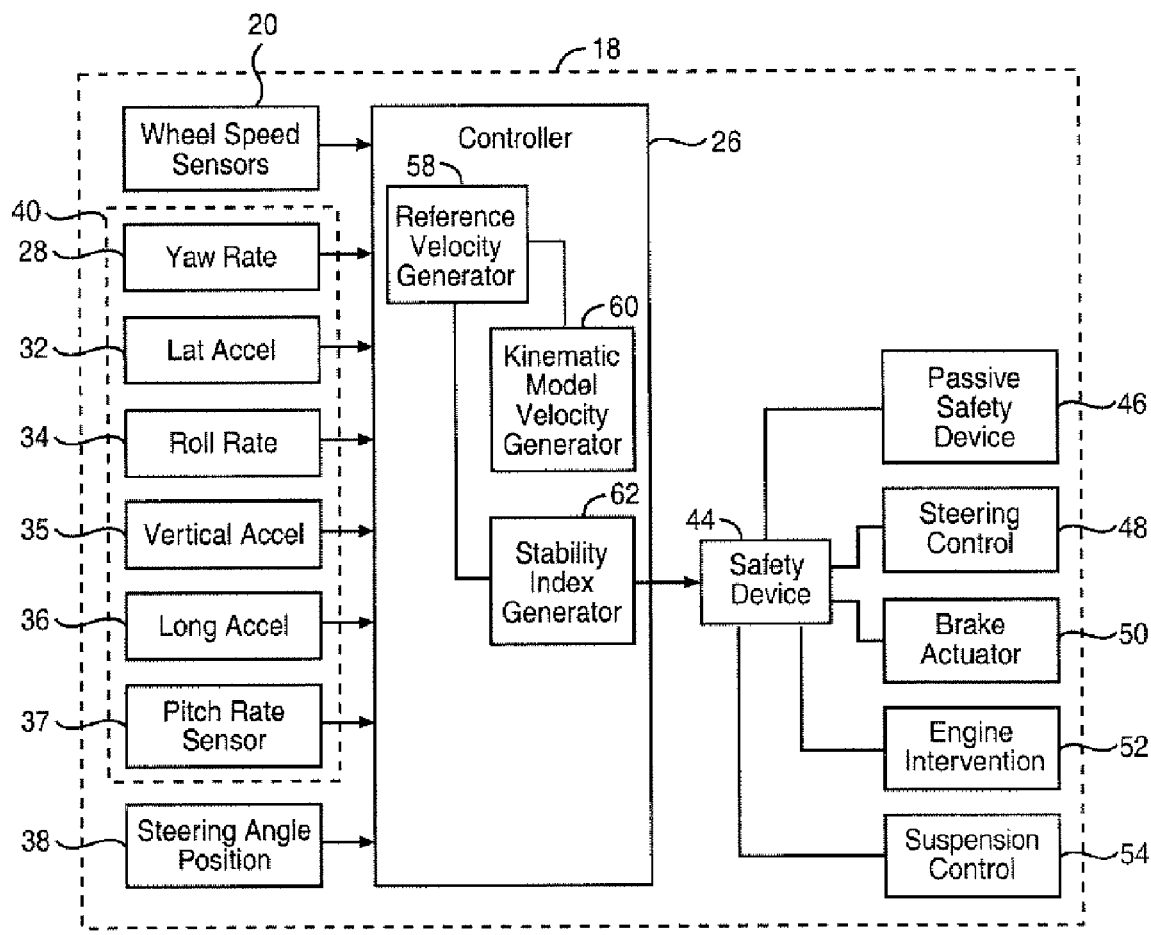
FIG. 2 is a block diagram of a stability system according to the present invention.

Referring now to FIG. 2, a stability control system 18 such as a yaw or roll system is illustrated in further detail having a controller 26 used for receiving information from a number of sensors which may include speed sensors 20, a yaw rate sensor 28, a lateral acceleration sensor 32, a roll rate sensor 34, a vertical acceleration sensor 35, a longitudinal acceleration sensor 36, a pitch rate sensor 37 and steering angle position sensor 38. Sensors 28-38 may be part of an integrated measurement unit 40 or IMU.

In the preferred embodiment the sensors are located at the center of gravity of the vehicle. Those skilled in the art will recognize that the sensor may also be located off the center of gravity and translated equivalently thereto.

Lateral acceleration, roll orientation and speed may be obtained using a global positioning system (GPS). Based upon inputs from the sensors, controller 26 may control a safety device 44. Depending on the desired sensitivity of the system and various other factors, not all the sensors 28-38 may be used in a commercial embodiment. Safety device 44 is part of a vehicle subsystem control. Safety device 44 may control a passive safety device 46 such as an airbag or a steering actuator 48, a braking actuator 50 at one or more of the wheels 12a, 12b, 13a, 13b of the vehicle. Engine intervention 52 may act to reduce engine power to provide a safety function. Also, other vehicle components such as a suspension control 54 may be used to adjust the suspension to prevent rollover.

Roll rate sensor 34 and pitch rate sensor 37 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll condition based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in an act of air suspension, a shock absorber sensor such as a load cell, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Steering control 48 may control the position of the front right wheel actuator, the front left wheel actuator, the rear left wheel actuator, and the right rear wheel actuator. Although as described above, two or more of the actuators may be simultaneously controlled. For example, in a rack-and-pinion system, the two wheels coupled thereto are simultaneously controlled. Based on the inputs from sensors 28 through 38, controller 26 determines a roll condition and controls the steering position of the wheels.

Speed sensor 20 may be one of a variety of speed sensors known to those skilled in the art. For example, a suitable speed sensor may include a sensor at every wheel or several of the wheels that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. For example, if speed is determined while speeding up or braking around a corner, the lowest or highest wheel speed may not be used because of its error. Also, a transmission sensor may be used to determine vehicle speed.

Controller 26 may include a reference velocity generator 58 and a kinematic model velocity generator 60. Each of the reference velocity generator 58 and the kinematic model velocity generator 60 generate a lateral velocity and a longitudinal velocity. A stability index generator 62 is used by the controller to generate an output corresponding to the lateral velocity and longitudinal velocity of the vehicle as selected using the stability index of the vehicle. That is, the stability index of the vehicle is used to choose the desired lateral and longitudinal velocity from either generator 58 or generator 60. While these functions are provided by controller 26, several controllers may be used to provide the same functions. One, several, or all of the safety devices in the vehicle may use lateral and longitudinal velocity determined by the reference velocity generator and the kinematic model velocity generator 60.

Figure 3:
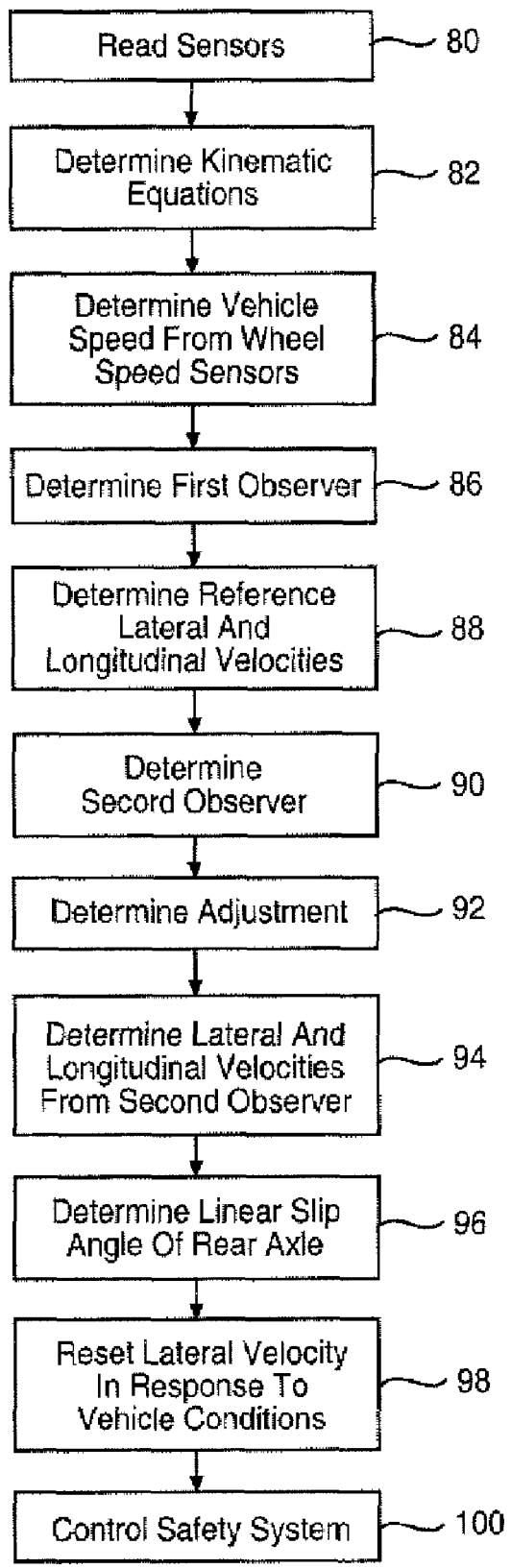
FIG. 3 is a block diagrammatic view of reference velocity generation according to the present invention.

Referring now to FIG. 3, a method for determining the lateral and longitudinal velocities is illustrated. In step 80 the various sensors are read. In the following description it is assumed that the sensor (IMU) in this embodiment is placed at the center of gravity and there is no misalignment with respect to the vehicle body frame.

Using the kinematic relationship between the sensors (IMU output) and the rates of changes of the Euler angles, and assuming that the rate of rotation of the earth is negligible, the state equations in step 82 for vehicle motion may be written as $$\dot{\theta}_x = \omega_x + (\omega_y \cdot \sin\theta_x + \omega_z \cdot \cos\theta_x) \cdot \tan\theta_y, \quad (1)$$

$$\dot{\theta}_y = \omega_y \cdot \cos\theta_x - \omega_z \cdot \sin\theta_x, \quad (2)$$

$$\dot{\theta}_z = (\omega_y \cdot \sin\theta_x + \omega_z \cdot \cos\theta_x) \cdot \sec\theta_y, \quad (3)$$

$$\dot{v}_x = a_x + \omega_z \cdot v_y - \omega_y \cdot v_z + g \cdot \sin\theta_y, \quad (4)$$

$$\dot{v}_y = a_y - \omega_z \cdot v_x + \omega_x \cdot v_z - g \cdot \sin\theta_x \cdot \cos\theta_y, \quad (5)$$

$$\dot{v}_z = a_z + \omega_y \cdot v_x - \omega_x \cdot v_y - g \cdot \cos\theta_y \cdot \cos\theta_y, \quad (6)$$

in which $v = [v_x, v_y, v_z]^T$ represent velocities, $\omega = [\omega_x, \omega_y, \omega_z]^T$ represent angular velocities, $a = [a_x, a_y, a_z]^T$ represent accelerations, all in body frame; $\theta = [\theta_x, \theta_y, \theta_z]^T$ represent the three Euler angles, roll, pitch and yaw, respectively; g is the gravitational constant which is assumed to be known. Equations (1)-(6) are the fundamental equations that govern the 3-D motion of the vehicle.

For vehicle dynamic control purpose, the Euler yaw angle $\theta_z$ (or the heading) is not required. As can be seen, the yaw angle $\theta_z$ does not find its way into the above equations except Equation (3). Furthermore, since the vehicle is constrained to move on a surface, the vertical velocity $v_z$ is normally very small and may be neglected. Thus the estimation determination is based on the following reduced kinematic equations:

$$\dot{\theta}_x = \omega_x + (\omega_y \cdot \sin\theta_x + \omega_z \cdot \cos\theta_x) \cdot \tan\theta_y, \quad (7)$$

$$\dot{\theta}_y = \omega_y \cdot \cos\theta_x - \omega_z \cdot \sin\theta_x, \quad (8)$$

$$\dot{v}_x = a_x + \omega_z \cdot v_y + g \cdot \sin\theta_y, \quad (9)$$

$$\dot{v}_y = a_y - \omega_z \cdot v_x - g \cdot \sin\theta_x \cdot \cos\theta_y, \quad (10)$$

The vehicle roll angle ($\theta_x$) and pitch angle ($\theta_y$) estimates may be obtained via the technique in U.S. patent application Ser. No. 10/752,741, filed Jan. 7, 2004, which is incorporated by reference herein and is assumed to be known here. Theoretically, the vehicle velocities may be computed via mathematical integration of Equations (9) and (10). However, in practice, direct integration intends to drift due to sensor bias and inevitable numerical errors. Absolute sensors such as GPS may be needed to constantly eliminate errors due to gyro integration. It is known to those skilled in the art that Kalman filters provide a way to fuse IMU signals and absolute sensor signals. However, probabilistic information regarding the measurement and process noises is normally required.

As will be seen in this embodiment, the present invention proposes a vehicle velocity estimation method that utilizes the measured accelerations, yaw rate, wheel speed and steering wheel angle to correct acceleration integration. In other words, the IMU/wheel speed/steering wheel angle sensors are used to provide information which is normally provided by absolute sensors such as GPS.

Obtain Reference Velocities

In step 84 the vehicle speed is determined from the wheel speed sensors. It is well known to those skilled in the art that wheel speed sensors can provide fairly accurate information about the vehicle speed, especially when wheel slip ratio is small:

$$v_w = \text{vehicle speed from wheel speed sensors} \quad (11)$$

Based on $v_w$ and a kinematics model, a vehicle lateral velocity estimate may also be obtained when ($\hat{\theta}_x, \hat{\theta}_y$)

vehicle yaw rate is not zero. In this invention, the vehicle attitude estimates are used in the kinematics model to reduce the estimation errors. The attitude estimates may be obtained via the technique proposed in U.S. patent application Ser. No. 10/752,741.

When the vehicle has a nonzero yaw rate, i.e., $|\omega_z|>\epsilon$, the reference velocities are obtained via the following observer in step 86:

$$\dot{v}_{xref}(k)=a_{xs}(k)+\omega_{zs}(k)\cdot v_{yref}(k)+g\cdot\sin\hat{\theta}_y(k)+k_1(v_w-v_{xref}), \quad (12)$$

$$\dot{v}_{yref}(k)=a_{ys}(k)-\omega_{zs}(k)\cdot v_{xref}(k)-g\cdot\sin\hat{\theta}_x(k)\cos\hat{\theta}_y(k)+k_2(v_w-v_{xref}), \quad (13)$$

where k represents the sampling instance, $\bullet_{*ref}$ represents reference signals, $\bullet_S$ represents measured quantities, $\epsilon$ is a positive design parameter called a stability index near zero which sets a threshold for yawing of the vehicle, a is a positive design parameter, and the observer gains $k_1$ and $k_2$ are defined as $$k_1=2\alpha|\omega_{zs}|, \quad k_2=(\alpha^2-1)\omega_{zs}. \quad (14)$$

By integration or numerical equivalent the reference lateral and longitudinal velocities may be determined in step 88. The velocity values may be obtained by using any numerical integration schemes, such as the trapezoidal method:

$$v_{xref}(k) = v_{xref}(k-1) + \frac{\dot{v}_{xref}(k) + \dot{v}_{xref}(k-1)}{2} \cdot T_s, \quad (15)$$

$$v_{yref}(k) = v_{yref}(k-1) + \frac{\dot{v}_{yref}(k) + \dot{v}_{yref}(k-1)}{2} \cdot T_s, \quad (16)$$

where $T_S$ is the sampling period. When $|\omega_z|>\epsilon$ and $v_w$ represents the true vehicle speed, the reference velocities $v_{xref}$ and $v_{yref}$ exponentially converge to the actual longitudinal and lateral velocities, respectively. The convergence rate may be adjusted by the observer gains $k_1$ and $k_2$.

Obtain Velocity Estimates Based on References and Kinematics Model

Note that accuracy of $v_{xref}$ and $v_{yref}$ relies on the magnitude of $\omega_z$ and the accuracy of $v_w$. When $\omega_z$ is very small, i.e., vehicle slides sideways (laterally), (12) and (13) basically provide no information about the vehicle velocities. As a result, $v_{xref}$ and $v_{yref}$ can no longer converge. When $v_w$ is not accurate, i.e., during ABS braking, $v_{xref}$ and $v_{yref}$ will converge to wrong values.

Therefore, a second observer which is a discrete-time nonlinear observer in step 90 is proposed to provide additional velocity information when magnitude of $\omega_z$ is small and $v_w$ is not reliable:

$$\dot{\hat{v}}_x(k)=a_{xs}(k)+\omega_{zs}(k)\cdot\hat{v}_y(k)+g\cdot\sin\hat{\theta}_y(k)+\Delta_{vx}, \quad (17)$$

$$\dot{\hat{v}}_y(k)=a_{ys}(k)-\omega_{zs}(k)\cdot\hat{v}_x(k)-g\cdot\sin\hat{\theta}_x(k)\cos\hat{\theta}_y(k)+\Delta_{vy}, \quad (18)$$

where $\hat{\bullet}$ represents computed quantities, and the adjustment $\Delta_{vx}$ and $\Delta_{vy}$ are determined in step 92 as $$\Delta_{vx}=K_{vx}(t)\cdot(v_{xref}-\hat{v}_x), \quad (19)$$

$$\Delta_{vy}=K_{vy}(t)\cdot(v_{yref}-\hat{v}_y), \quad (20)$$

in which $K_{vx}$ and $K_{vy}$ are non-negative tunable observer gains. In step 94 the longitudinal and lateral velocity of the vehicle is determined using the second observer. The velocity values may be obtained by using any numerical integration schemes, such as the trapezoidal method:

$$\hat{v}_x(k) = \hat{v}_x(k-1) + \frac{\dot{\hat{v}}_x(k) + \dot{\hat{v}}_x(k-1)}{2} \cdot T_s, \quad (21)$$

$$\hat{v}_y(k) = \hat{v}_y(k-1) + \frac{\dot{\hat{v}}_y(k) + \dot{\hat{v}}_y(k-1)}{2} \cdot T_s. \quad (22)$$

It can be seen that when $K_{vx}=K_{vy}=0$, the above scheme is equivalent to pure integration. When $K_{vx}>0$ and $K_{vy}>0$, the estimates $\hat{v}_x$ and $\hat{v}_y$ exponentially converge to their references $v_{xref}$ and $v_{yref}$, respectively. The convergence rate and final accuracy may be adjusted by the observer gains.

The above scheme uses the second observer in Equations (17)-(18) to blend the IMU accelerometer signals with the reference signals. Observer gains $K_{vx}$ and $K_{vy}$ are determined based on vehicle status. When $|\omega_z|>\epsilon$ and $v_w$ is reliable, the reference signals are normally very accurate and the observer gains may be increased as a rule. In such cases, the reference signals are trusted more and the integrations are trusted less. On the other hand, as $v_w$ becomes unreliable or $|\omega_z|$ decreases, the reference signals normally are not trustworthy. The tunable observer gains should be reduced so that the estimates rely more on the integrations. Thus, using the stability index $\epsilon$ the more reliable lateral velocity and longitudinal velocity is chosen for an output from the reference velocities and the velocities from the second observer.

There are many variables that may be used to determine the observer gains, i.e., drive torque, steering wheel rate ($\delta_H$), desired yaw rate ($\omega_{zd}$), measured yaw rate ($\omega_{zs}$), desired lateral acceleration ($a_{yd}$), measured lateral acceleration ($a_{ys}$), wheel slip ($\lambda$), driver brake request, ABS-in-cycle flag, TCS-in-cycle flag, etc. The observer gains can be scheduled by certain fuzzy logics, or in general, by any appropriate functions of these variables, i.e., $$K_{vx}(t)=f_1(\delta_H,\lambda,\ldots), \quad (22)$$

$$K_{vy}(t)=f_2(\delta_H,\lambda,\ldots). \quad (23)$$

Reset Lateral Velocity Estimate Using Linear Tire Slip Angle

In step 96 the linear slip angle of the rear axle is determined. The linear slip angle of rear axle ($a_y$) provides good information about the phase of the lateral velocity, and it may be used to reset the lateral velocity estimate to further improve the estimation accuracy and robustness. $a_y$ is obtained from the bicycle model:

$$F_{yr} = M \cdot a_{ys} - \frac{I_z \cdot \dot{\omega}_z}{L} \quad (24)$$

-continued $$\alpha_r = \frac{-F_{yr} \cdot R_{cc}}{M \cdot g} \quad (25)$$

where $F_{yr}$ represents the lateral tire force, M is the vehicle mass, $I_z$ is the yaw moment of inertia, L is the wheel base, and $R_{cc}$ is the rear cornering compliance.

$\hat{v}_y$ and $v_{ref}$ are reset to zero using the following logic in step 98:

If $\alpha_r(k)=0$, then $\hat{v}_y(k)=0$ and $v_{yref}(k)=0$. (26)

In step 100, one or all of the safety systems may be controlled using the lateral velocity, the longitudinal velocity or both.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A system for controlling a safety system of an automotive vehicle, said system comprising:
   a plurality of wheel speed sensors;
   a longitudinal acceleration sensor for generating a longitudinal acceleration signal;
   a vehicle speed sensor for generating a vehicle speed signal;
   a lateral acceleration sensor for generating a lateral acceleration signal;
   a yaw rate sensor for generating a yaw rate signal; and
   a controller coupled to said longitudinal acceleration sensor, said vehicle speed sensor, said lateral acceleration sensor, and said yaw rate sensor;
   wherein said controller is operable to determine a stability index and provide a first observer for determining a reference longitudinal velocity in response to said longitudinal acceleration signal, said yaw rate signal, a pitch attitude, and vehicle speed from said wheel speed sensors;
   wherein said controller is operable to determine a reference lateral velocity in response to said lateral acceleration signal, said yaw rate signal, a roll attitude, a pitch attitude, and vehicle speed from said wheel speed sensors;
   wherein said controller is operable to provide a second observer for determining a second longitudinal velocity in response to said longitudinal acceleration signal, said yaw rate signal, a lateral velocity, said pitch attitude, and a first adjustment based on said reference longitudinal velocity;
   wherein said controller is operable to determine a second lateral velocity in response to said lateral acceleration signal, said yaw rate signal, a roll attitude, a pitch attitude, and a second adjustment based on said reference lateral velocity;
   wherein said controller is operable to determine an output lateral velocity and an output longitudinal velocity in response to said first observer, said second observer, and said stability index; and
   wherein said controller is operable to control said safety system in response to said output lateral velocity and said output longitudinal velocity.

2. A system as recited in claim 1, wherein said safety system includes at least one system selected from the group consisting of an antilock-brake system (ABS), a roll stability control (RSC) system, a traction control system, and a yaw stability control (YSC) system.

3. A system as recited in claim 1, wherein said controller is operable to determine said output lateral velocity and said output longitudinal velocity in response to said first observer, said second observer, said stability index, and the wheel speed from at least one of said wheel speed sensors.

4. A method for controlling a system of a vehicle, said method comprising the steps of:
   determining a stability index;
   providing a first observer that determines a reference longitudinal velocity in response to a longitudinal acceleration, yaw rate, a pitch attitude, and vehicle speed from wheel speed sensors;
   determining a reference lateral velocity in response to a lateral acceleration, yaw rate, a roll attitude, a pitch attitude, and vehicle speed from wheel speed sensors;
   providing a second observer that determines a second longitudinal velocity in response to a longitudinal acceleration, yaw rate, a lateral velocity, a pitch attitude, and a first adjustment based on said reference longitudinal velocity;
   determining a second lateral velocity in response to a lateral acceleration, yaw rate, said roll attitude, said pitch attitude, and a second adjustment based on said reference lateral velocity;
   determining an output lateral velocity and an output longitudinal velocity in response to said first observer, said second observer, and said stability index; and
   controlling a vehicle system in response to said output lateral velocity and said output longitudinal velocity.

5. A method as recited in claim 4, wherein said output lateral velocity and said output longitudinal velocity are determined in response to said first observer, said second observer, said stability index, and the wheel speed from at least one of said wheel speed sensors.

6. A method as recited in claim 4, wherein said output lateral velocity and said output longitudinal velocity are determined in response to said first observer when said yaw rate is above said stability index.

7. A method as recited in claim 4, wherein said output lateral velocity and said output longitudinal velocity are determined in response to said first observer when said yaw rate is above said stability index and the wheel speed from at least one of said wheel speed sensors is reliable.

8. A method as recited in claim 4, wherein said output lateral velocity and said output longitudinal velocity are determined in response to said second observer when said yaw rate is below said stability index or the wheel speed from at least one of said wheel speed sensors is unreliable.

9. A method as recited in claim 8, wherein said wheel speed is unreliable during antilock braking.

10. A method as recited in claim 4, said method further comprising the step of resetting said reference lateral velocity and said second lateral velocity in response to a linear slip angle of a rear axle.

11. A method as recited in claim 4, said method further comprising the step of resetting said reference lateral velocity and said second lateral velocity in response to a linear slip angle of a rear axle and about zero.

12. A method as recited in claim 4, wherein said second observer is a kinematic-based observer.

13. A method for controlling a system of a vehicle, said method comprising the steps of:

generating a plurality of wheel speed signals with a plurality of wheel speed sensors;
determining vehicle speed in response to said plurality of wheel speed signals;
generating a lateral acceleration signal;
generating a yaw rate signal;
generating a longitudinal acceleration signal;
determining a stability index in response to said yaw rate signal;
determining a reference longitudinal velocity in response to said longitudinal acceleration signal, said yaw rate signal, a pitch attitude, and said vehicle speed;
determining a second longitudinal velocity in response to said longitudinal acceleration signal, said yaw rate signal, a lateral velocity, and a pitch attitude;
determining an output longitudinal velocity from either said reference longitudinal velocity or said second longitudinal velocity in response to said stability index; and
controlling a vehicle system in response to said output longitudinal velocity.

14. A method as recited in claim 13, wherein said output longitudinal velocity is determined in response to a first observer, a second observer, said stability index, and the wheel speed from at least one of said wheel speed sensors.

15. A method as recited in claim 13, wherein said output longitudinal velocity is determined in response to a first observer when the yaw rate is above said stability index.

16. A method as recited in claim 13, wherein said output longitudinal velocity is determined in response to a first observer when the yaw rate is above said stability index and the wheel speed from at least one of said wheel speed sensors is reliable.

17. A method as recited in claim 16, wherein said output longitudinal velocity is determined in response to a second observer when said yaw rate is below said stability index or the wheel speed from at least one of said wheel speed sensors is unreliable.

18. A method for controlling a system of a vehicle, said method comprising the steps of:

generating a plurality of wheel speed signals with a plurality of wheel speed sensors;
determining vehicle speed in response to said plurality of wheel speed signals;
generating a lateral acceleration signal;
generating a longitudinal acceleration signal;
generating a yaw rate signal;
determining a stability index in response to said yaw rate signal;
determining a reference lateral velocity in response to said lateral acceleration signal, said yaw rate signal, a roll attitude, a pitch attitude, and said vehicle speed;
determining a second lateral velocity in response to said lateral acceleration signal, said yaw rate signal, said roll attitude, said pitch attitude, and a second adjustment based on said reference lateral velocity;
determining an output lateral velocity from either said reference lateral velocity or said second lateral velocity in response to said stability index; and
controlling a vehicle system in response to said output lateral velocity.

19. A method as recited in claim 18, said method further comprising the step of resetting said reference lateral velocity and said second lateral velocity in response to a linear slip angle of a rear axle and about zero.

20. A method as recited in claim 18, wherein said output lateral velocity is determined in response to a first observer when the yaw rate is above said stability index.

21. A method as recited in claim 18, wherein said output lateral velocity is determined in response to a first observer when the yaw rate is above said stability index and the wheel speed from at least one of said wheel speed sensors is reliable.

22. A method as recited in claim 21, wherein said output lateral velocity is determined in response to a second observer when said yaw rate is below said stability index or the wheel speed from at least one of said wheel speed sensors is unreliable.

* * * * *